July 5, 1932.   E. W. SIBLEY   1,865,974
ATTACHMENT FOR ADDRESSING MACHINES
Filed Aug. 7, 1926   5 Sheets-Sheet 1

Inventor
Edward W. Sibley
by
Barton A. Bean Jr.
Atty.

July 5, 1932.  E. W. SIBLEY  1,865,974
ATTACHMENT FOR ADDRESSING MACHINES
Filed Aug. 7, 1926   5 Sheets-Sheet 2
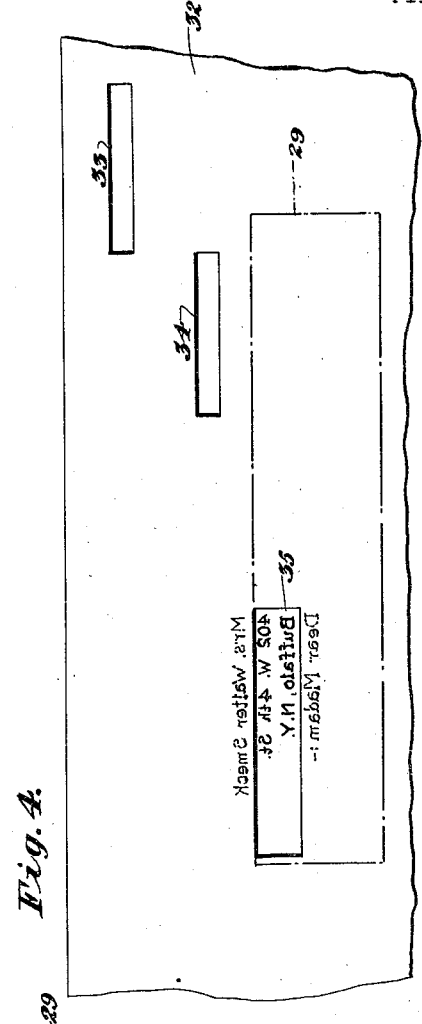
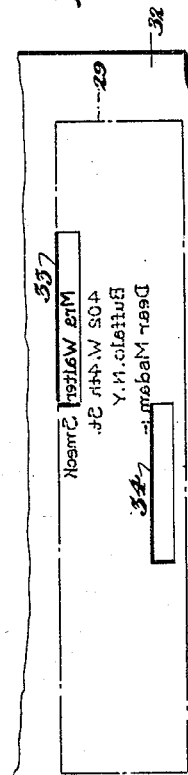
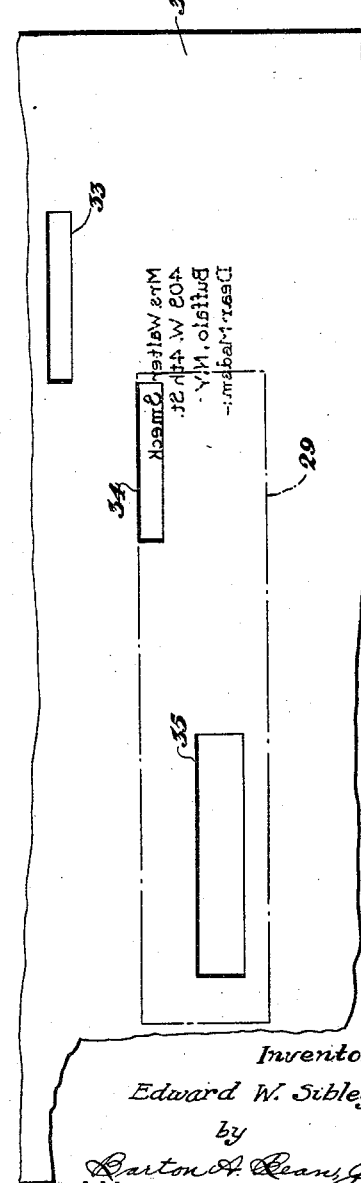
Inventor
Edward W. Sibley
by
Barton A. Bean, Jr.
Atty.

July 5, 1932.   E. W. SIBLEY   1,865,974
ATTACHMENT FOR ADDRESSING MACHINES
Filed Aug. 7, 1926   5 Sheets-Sheet 3
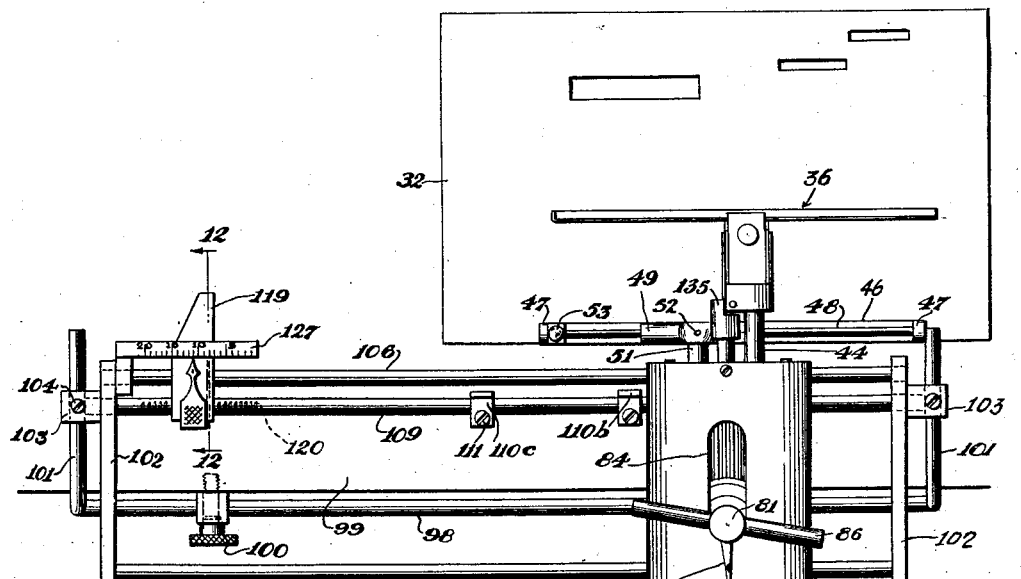
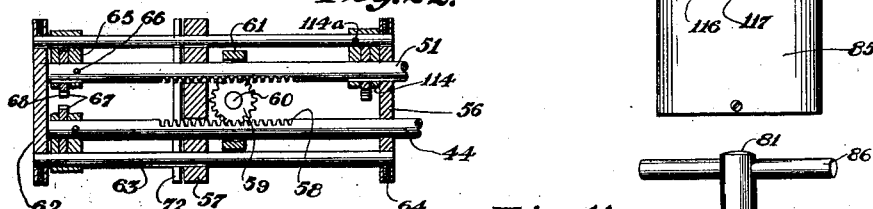
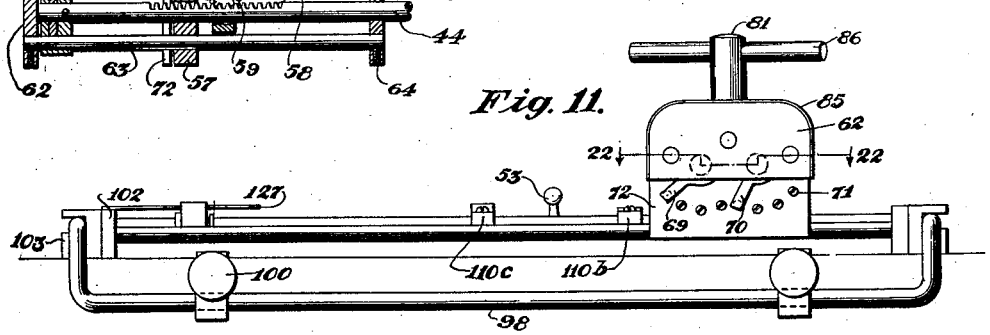
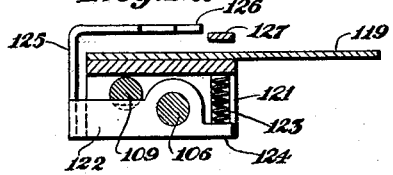
Inventor
Edward W. Sibley
by
Barton A. Bean Jr.
Atty.

July 5, 1932.  E. W. SIBLEY  1,865,974
ATTACHMENT FOR ADDRESSING MACHINES
Filed Aug. 7, 1926   5 Sheets-Sheet 4

Inventor
Edward W. Sibley
by
Barton A. Dean Jr.
Atty.

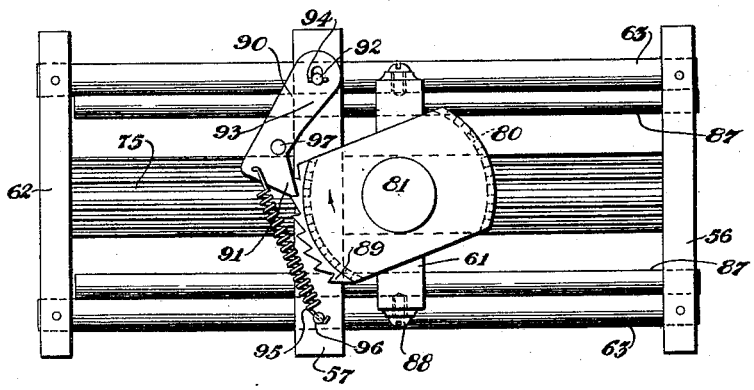

Patented July 5, 1932

1,865,974

UNITED STATES PATENT OFFICE

EDWARD W. SIBLEY, OF KENMORE, NEW YORK, ASSIGNOR, BY MESNE ASSIGNMENTS, TO REMINGTON RAND INC., OF NEW YORK, N. Y., A CORPORATION OF DELAWARE

ATTACHMENT FOR ADDRESSING MACHINES

Application filed August 7, 1926. Serial No. 127,765.

This invention relates to attachments for addressing machines and has reference more particularly to attachments for addressing machines wherein relative movement between a card to be printed and a slotted mask is provided.

In the operation of addressing machines, an electro-plate is provided which includes notations for transference onto a letterhead, an example of these notations being given as follows:

Mrs. Walter Smeck
    402 W. 4th St.
    Wilmington, Delaware
    Dear Madam:

In addressing envelopes the last notation, "Dear Madam:", is omitted by covering this notation on the plate with a mask so that the envelope is only exposed to the remaining part of the notations.

In making various kinds of lists such as stockholders, telephone, customers and mailing lists, it is desirable to use this same electro-plate but to arrange the notations in various orders along one margin of a card in convenient position for proper indexing. Thus the notations appearing in the above example might be arranged in any one of a number of ways, some of them being given as follows:

Smeck, Mrs. Walter  402 W. 4th St.
                           Wilmington, Del.
  W. 4th St., 402  Mrs. Walter Smeck
  Wilmington, Del.  402 W. 4th St.,
                        Mrs. Walter Smeck
  Del. Wilmington  402 W. 4th St.,
                        Mrs. Walter Smeck In order to accomplish the above results it is necessary to provide a mechanism which will move both a card to be printed and a slotted mask extending between the card and the electro-plate so that when the roller or platen of the addressograph machine is applied successively for printing notations on the cards, the card is positioned for each printing so that the notation will be properly positioned on the card and the slots in the mask will be so positioned that the notations not wanted will be covered up, the electro-plate remaining stationary during all of these movements.

An object of this invention is to provide a mechanism which will achieve the above results with maximum speed so that large numbers of cards may be properly and expeditiously printed with index matter.

Another object of this invention is to provide a mechanism which can be manufactured at a comparatively low cost and which can be quickly and easily adjusted to provide any desired arrangement of the notations on an index card; also to improve addressing attachments in other respects hereinafter specified and claimed.

Reference is to be had to the accompanying drawings forming a part of this specification, in which:

Fig. 3 is a copy of the notations printed from an addressing machine electro-plate as commonly employed.

Figs. 4, 5 and 6 are plan views of a slotted mask and card positioned successively in operations of the addressing machine roller.

Figs. 7, 8 and 9 are plan views of a card with notations applied in the different operations shown in Figs. 4, 5 and 6 respectively.

Fig. 10 is a plan view of my improved addressing machine attachment.

Fig. 11 is a rear elevation of the attachment.

Fig. 12 is a sectional view through the attachment on line 12—12 of Fig. 10.

Figure 1:
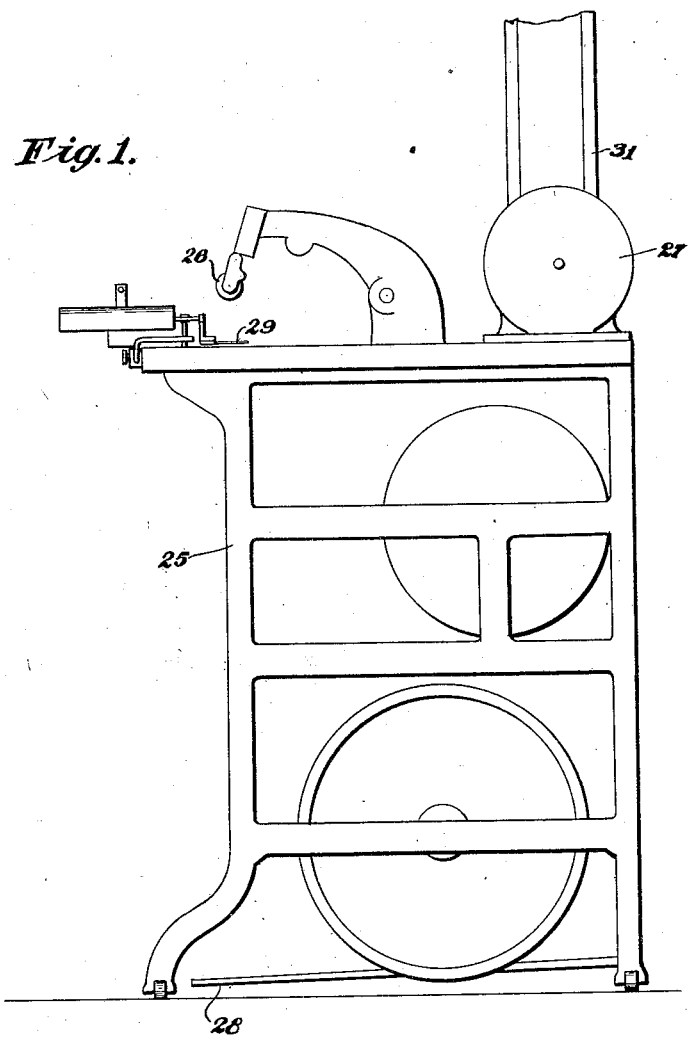
Fig. 1 is a side elevation of one form of addressing machine with my improved attachment in place.
Figure 2:
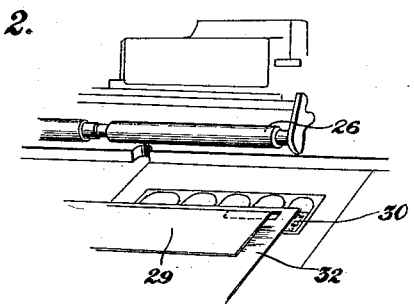
Fig. 2 is a perspective view of a portion of the addressing machine showing a slotted mask interposed between a card to be printed and the electro-plate.
Figure 13:
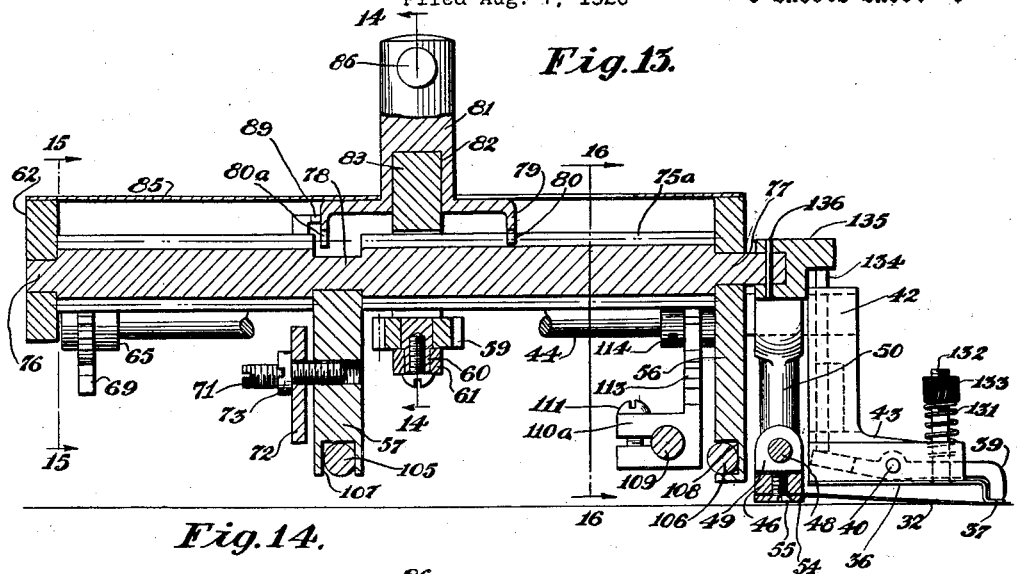
Fig. 13 is a central, longitudinal, sectional view through the addressing machine attachment.
Figure 14:
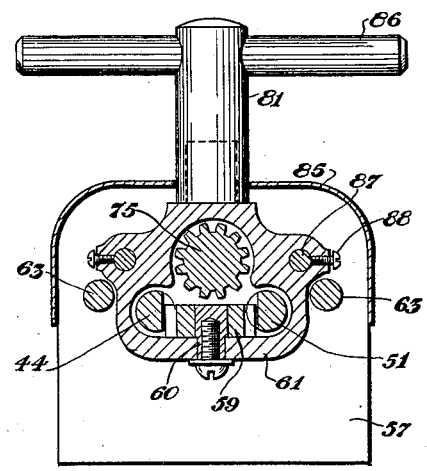
Figure 15:
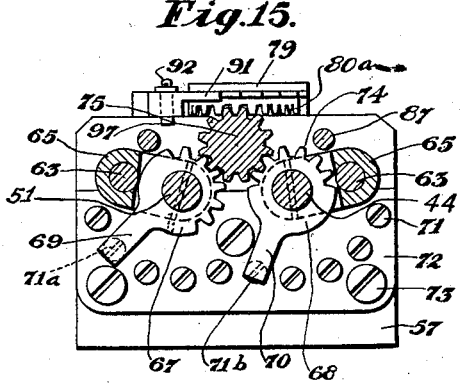
Figure 16:
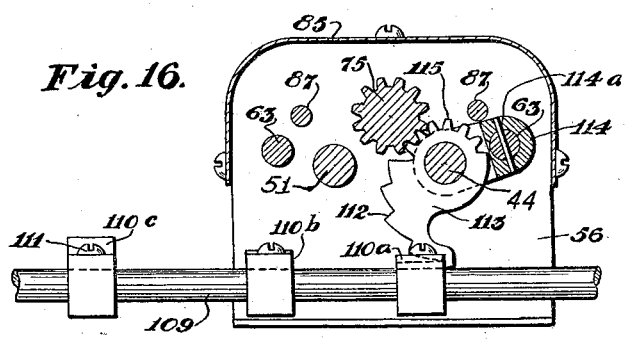

Figs. 14, 15 and 16 are transverse sectional views through the attachment taken on lines 14—14, 15—15 and 16—16 respectively of Fig. 13.

Fig. 17 is a plan view of some of the internal mechanism of the attachment removed from its casing showing a rachet and pawl arranged in one position.

Fig. 18 is a plan elevation of the rachet and pawl in a second position.

Fig. 19 is a side elevation of the card holder shown in card releasing position.

Fig. 20 is a vertical sectional elevation through the card holder of the attachment.

Fig. 21 is a horizontal sectional view through the card holder taken on line 21—21 of Fig. 19.

Fig. 22 is a horizontal sectional view through the attachment on line 22—22 of Fig. 11.

Fig. 23 is an elevation of the automatic card release device.

Referring to the drawings by numerals in which like numerals represent like parts in the several views, 25 indicates the frame of one type of an addressing machine which is commonly provided with a roller or platen 26 which is operatively connected to a motor 27 so that when a foot treadle 28 is actuated, the platen moves downwardly onto a card 29 to be printed and then moves rearwardly so that the inscriptions or notations formed in raised letters on an electro-plate 30 are printed on the bottom surface of the card 29. An inking ribbon not shown is interposed between the electro-plate 30 and card 29. A vertical electro-plate holder or slide 31 is generally provided on the addressing machine so that the electro-plates are positioned in this holder in a vertical stack, mechanism being provided on the addressing machine to successively move the lowermost electro-plate in the stack into printing position. All of these parts are well known in the art and form no part of the invention.

As shown in Fig. 3 and as previously explained, the notations or inscriptions formed by raised letters on the electro-plate usually include the name of a person, a street address, city and state, and a salutation, "Dear Madam or Dear Sir." In order to arrange these inscriptions along one margin of a card, I provide a mask 32 having slots 33, 34 and 35 formed in the body thereof, said mask being positioned between the card 29 and the electro-plate 30. Figs. 4, 5 and 6 show the relative arrangement of the card 29 and mask 32 for three successive printings or movements of the platen 26 to arrange the notations in one of the examples given above, as follows:

Smeck, Mrs. Walter 402 W. 4th St.
Wilmington, Del.

It will be seen from Fig. 4 that during the first operation of the platen 26, slot 35 exposes the address of the party while the name and title of the party is covered up by the mask 32 so as to produce the result on the card shown in Fig. 7. During the second operation of the platen 26, slot 33 exposes the Christian name of the party while the last of the inscriptions are covered up by the body of the mask 32 to produce the result shown in Fig. 8. During the third operation of the platen 26, slot 34 exposes the surname of the party while the rest of the inscriptions are covered up by the body of the mask 32, so as to produce the final result shown in Fig. 9. Thus cards produced with these successive arrangements of mask 32, and card 29 will produce cards as shown in Fig. 9, indexed according to surname of the party. My mechanism also may be easily adjusted to have the card indexed for any other part of the notations such as street, state or city, according to the results desired.

My improved mechanism is adapted to provide for the rapid and accurate relative movements of the mask 32 and card 29 so as to produce the finished index card shown in Fig. 9 by three successive movements of the platen 26. This mechanism provides for both transverse and longitudinal movement of both the card 29 and mask 32 and provides relative vertical movement between the card 29 and the inking ribbon during each movement of the card 29 so that the ink on the ribbon will not be smeared across the card. My improved mechanism also provides for the automatic release of the card from its holder after the printing thereof is complete.

The card holder 36 preferably consists of a metal stamping having an offset flange 37 adapted to receive one margin of the card 29. This card holder has preferably a pair of parallel upstanding flanges 38 formed on opposite edges so as to form a member substantially U-shaped in cross section. A clamping jaw 39 is pivotally mounted intermediate its ends on pin 40 between the flanges 38, the end opposite the clamping jaw having offset finger 41, (Figs. 20 and 21) for a purpose to be hereinafter described. A card holder frame 42 is provided at its lower end with a pair of forwardly extending flanges 43 through which passes the pivot pin 40 and between which the card holder 36 is included. The upper end of the frame 42 is provided with a transversely extending opening adapted to receive a card operating bar 44 secured to the frame 42 by means of a pin 45. This bar 44 is adapted to be reciprocated axially so as to accomplish the longitudinal movement of the card 29 for the purpose of properly positioning the notations along a margin thereof. The mechanism for accomplishing this accurate and predetermined reciprocation of the bar 44 will be more fully described herein. The mask holder is preferably formed of a horizontal bar 46 having an upstanding ear 47 formed at each end, each ear having a hole adapted to receive a horizontally extending pin 48. The pin 48 is adapted to be slidably received by a horizontally extending arm 49 formed on the bottom of a vertically extending arm 50, the upper end of said vertical arm being secured to one end of a slide bar 51 by means of pin 52. The horizontal arm 49 is considerably shorter than the distance between the ears 47 so that the mask holder 46 may be moved transversely by the pin 48 sliding through the horizontal arm 49, an upstanding handle 53 being provided for easy manual actuation of the mask transversely. One edge of the mask 32 is secured to the mask holder 46 by a clamping strip 54 attached to said holder by means of screws 55 passing through the clamping strip 54, mask 32, and into threaded holes in the mask holder 46.

The slide bars 44 and 51 are slidably mounted in openings in a front frame member 56, and are also slidably mounted on an intermediate frame member 57. Rack teeth 58 are formed on the inner areas of each of the slide bars 44 and 51 intermediate the ends thereof, and differential pinion 59 meshes with the rack teeth of both bars, said pinion being rotatably mounted on a pin 60 which is secured to a slide carriage 61. The mechanism is provided with a rear frame member 62, said frame member being rigidly secured to the front frame member 56 by means of a plurality of connecting rods 63, said rods being secured to said frame members in any suitable way such as by set screws 64. The rearward ends of slide bars 44 and 51 are provided with forked slide members 65 secured thereto by pins 66. One end of each of the slide members 65 is slidably mounted on one of the rods 63 so that said slide member is free to reciprocate axially of said rods 63. A stop gear 67 and 68 is rotatably mounted on the end of the rods 51 and 44 respectively between the legs of the forked slide members 65. Stop gears 67 and 68 have stop arms 69 and 70 arranged substantially radially thereto for the purpose of engaging the heads of limit stop screws 71 secured to the intermediate frame member 57 in two semi-circles of sufficient radius to be in line with the ends of arms 69 and 70. Thus when bars 44 and 51 are reciprocated forwardly by differential pinion 59, the slide members 65 are also moved forwardly, carrying with them the stop gears 67 and 68 until the ends of arms 69 and 70 engage the ends of stop screws 71, which limits the forward movement of slide bars 44 and 51.

The stop screws 71 are locked in position by means of a lock plate 72, said screws 71 being threaded into both the locking plate 72 and frame member 57. A plurality of lock screws 73 are rotatably received in the locking plate 72 and are threaded into the intermediate frame member 57 so that when said lock screws 73 are tightened, all of the stop screws 71 are prevented from rotations due to vibration. Each of the stop gears 67 and 68 is provided with a semi-circular series of gear teeth 74 adapted to mesh with the teeth of a longitudinal pinion rod 75. The rear end of the pinion rod 75 has a section 76 of smaller diameter adapted to be rotatably received in an opening in the rear frame member 62. The front end of the pinion rod 75 is provided with a section 77 of smaller diameter adapted to be rotatably received in the front frame member 56. A section 78 of small diameter is formed intermediate the ends of the pinion rod 75 and is adapted to be received in a semi-circular bearing formed on the upper edge of the intermediate frame member 57 for the purpose of preventing deflection of said pinion rod in its center.

In order to accomplish the partial rotation of the pinion rod 75, and stop gears 67 and 68, a crown gear 79 is in the form of a cylinder having teeth 80 around the lower end thereof in two semi-circular series. The upper end of the crown gear 79 is provided with a vertically extending handle support 81 having a lower cylindrical bearing opening 82 adapted to be rotatably received on a stud 83 formed on the upper end of the carriage 61. The handle member 81 extends through a slot 84 formed in a U-shaped casing 85 secured between the frame members 56 and 62. The front semi-circular series of teeth 80 on crown gear 79 is adapted to engage the teeth of the pinion rod 75 at all times so that by partially rotating the crown gear 79 by means of transverse handle 86 formed on the upper end of the member 81, the partial rotation of pinion rod 75 and stop gears 67 and 68 is accomplished.

The slot 84 in casing 85 is adapted to permit the longitudinal reciprocation of crown gear 79, carriage 61 and differential pinion 59. The differential pinion acts on the slide bars 44 and 51 so as to cause them to move forwardly also, carrying with them the card holder 36 and mask holder 46 to a predetermined point where the ends of the stop arms 69 and 70 engage their respective stop screws 71. Carriage 61 is guided in its forward reciprocation by means of guide rods 87 secured thereto by set screws 88, the forward ends of said rods 87 being slidably received in frame member 56 and the rearward ends of said rods 87 being slidably received in frame member 57. When the handle member 81 is in its rearmost position as shown in Fig. 13, the rear series of crown gear teeth 80a operate freely in the annular groove formed by bearing section 78 so as to permit the partial rotation of the crown gear 79. As the handle member 81 is reciprocated forwardly, the rear gear teeth 80a mesh with the forward teeth 75a of pinion rod 75 so that the crown gear 79 then becomes locked and cannot be rotated.

It should be understood that each of the stop screws 71 is positioned so as to locate both the card 29 and mask 32 at a definite predetermined station when the handle member 81 is reciprocated forwardly. Thus when the mechanism is adjusted to produce the conditions shown in Fig. 4, the stop arms 69 and 70 may contact with the stop screws 71a and 71b in the foremost position of handle member 81 so as to properly align the slot 35 with the desired address on the electro-plate 30, while the card 29 is located with its margin near the same address notations. After the first printing of the address on the card as shown in Fig. 7, it is desired to have the stop arms 69 and 70 rotated to a position opposite the next stop screws 71c and 71d and no farther. For the purpose of limiting the rotation of stop arms 69 and 70 to a step-by-step rotation, rachet teeth 89 are formed in a semi-circle on the outer surface of the rear of crown gear 79. Pawl 90 has a tooth 91 adapted to engage the rachet teeth 89. The pawl 90 is loosely connected to a pivot pin 92 by means of pivot slot 93, said pawl being prevented from vertical movement on the pivot 92 by means of a transverse pin 94 extending through the pin 92. As shown in Figs. 17 and 18, a spring 95 connects the end of the pawl 90 opposite pivot pin 92 with a pin 96 secured to the intermediate frame member 57 so that the pawl tooth is resiliently pressed against the rachet teeth 89, the inward movement of said pawl 90 being limited by a stop pin 97 engaging the frame member 57. After the partial rotation of the handle member 81 to the new position where stop arms 69 and 70 register with stop pins 71c and 71d, the forward reciprocation of the handle member 81 pulls the rachet teeth 89 out of engagement with the pawl tooth 91. Now free, the spring 95 gives the pawl 90 a slight lateral movement permitted by the slot 93 so that when the rachet teeth 89 are again reciprocated rearwardly to produce a new position of card 29 and mask 32, the rachet teeth 89 can be rotated only part of the distance of one rachet tooth as shown in Fig. 18. After engagement of the pawl tooth 91 with the new rachet tooth 89 a clockwise rotation of the crown gear 79 as seen in Fig. 18 is again limited by the pawl tooth 91 to an arc which moves the stop arms 69 and 70 only the distance between two of the stop screws 71.

The mechanism herein above described is capable of locating the card 29 and mask 32 only as to their longitudinal position with reference to the electro-plate 30. The transverse movement of the mask 32 with reference to the electro-plate 30 is accomplished by the manual actuation of the handle 53. In order to properly position the card 29 laterally with respect to the electro-plate 30, it is necessary to move the entire mechanism laterally. For this purpose a slide frame rod 98 is secured to the bed 99 of the addressing machine by means of set bolts 100, said rod 98 having offset arms 101 extending forwardly above the top of the machine 99. Side frame members 102 have ears 103 slidably received on the arms 101 but rigidly secured thereto by set screws 104, transverse rods 105 and 106 extending between members 102, and are rigidly secured thereto. A groove 107 is formed in the bottom of the frame member 57 for slidably receiving the rod 105 and a groove 108 is formed on the inside of the lower edge of frame member 56 to slidably receive the rod 106. This arrangement of the grooves 107 and 108 permits the easy removal of the attachment from the bars 105 and 106 for adjustment by tilting the attachment until the groove 107 is disengaged from rod 105, after which a slight forward movement will disengage the slot 108 from rod 106.

A stop rod 109 is rigidly secured between frame members 102 and a series of stops 110a, 110b and 110c is adjustably mounted on the rod 109 by means of set screws 111. The stops 110a, 110b and 110c extend vertically to successively greater heights, and are adapted to be engaged by stop shoulders 112 formed on a stop arm 113. The stop arm 113 is rotatably mounted on the rod 51 and is prevented from reciprocation with said rod by means of a forked arm 114 extending on either side of said stop arm 113, the outer end of said fork arm 114 being secured to the rod 63 by means of a pin 114a. The stop arm 113 is provided with a semi-circular series of gear teeth 115 adapted to mesh with the teeth of the pinion rod 75 so that when said pinion rod is given a partial rotation, the stop arm 113 is also partially rotated, and the desired stop shoulder is in alignment to register with the desired stop 110a, 110b or 110c, said stop shoulders 112 being at successively greater radial distances from the center of the rod 51. Thus for example when the stop arm 113 is rotated so that a given shoulder 112 will register and be in alignment with the stop 110b, the entire attachment may be moved to the left as seen in Fig. 10 until the proper stop shoulder 112 is in engagement with the stop 110b, which positions the card 29 in its proper transverse position to receive the printed notations from the electro-plate 30.

An indicating plate 116 is provided with spaced indicating numerals 117, and is attached to the upper surface of the case 85. A pointer 118 is attached to the handle member 81 so as to cooperate with the indicating plate 116 so that the operator may observe the exact adjustment of the mechanism as to the relative position of card 29 and mask 32. For the first printing operation as shown in Figs. 4 and 7, the mask handle is moved to the right manually by handle 53 until ear 47 engages with arm 101, as seen in Fig. 10. For the next printing operation the mask is moved to the left manually by actuating handle 53 until said handle 53 engages a stop arm 119.

Said arm 119 is slidably received on rods 106 and 109, a series of teeth being formed on the under side of rod 109 for the purpose of determining the exact lateral position of the stop arm 119. The stop arm 119 has two downwardly extending flanges 121, through which rods 106 and 109 pass, and a lock 122 is pivotally mounted on rod 106 between flanges 121. A spring 123 between stop arm 119 and a finger 124 formed on the forward end of lock arm 122 normally urges the lock arm 122 in a clockwise direction as seen in Fig. 12 so that the upper edge of said lock arm engages the teeth 120 to properly locate the stop arm 119. An indicating arm 125 extends upwardly and forwardly with respect to stop arm 119, a pointer 126 being formed on its forward end adapted to cooperate with a scale 127 secured to frame 102 so as to indicate the position of the mask with respect to the electro-plate on the second and third printing operation. By pressing down on the indicating arm 125, the lock arm 122 is disengaged from teeth 120 and the stop arm 119 can then be moved axially of the rod 106 to any desired adjusted position.

The card 29 is normally slightly inclined upwardly as shown in Fig. 20 by means of a spring 128 in a socket 129 formed in the member 42. The lower end of the spring 128 is seated on a stud 130 secured to the card holder 36. The purpose of the inclined position of the card 29 is to prevent smearing of the card on the inking ribbon when said card is moved longitudinally or transversely. The card 29 is normally clamped firmly between flange 37 and clamp 39 by means of a spring 131, said spring being held in position by means of a screw 132 extending upwardly from card holder 36, the tension in said spring being adjustable by means of a nut 133.

In order to automatically release the card from the clamping member 39 after the last printing operation shown in Fig. 9 is complete, a release pin 134 passes vertically upwardly through the member 42, the lower end engaging the finger 41. An annular cam collar 135 fits over the end of the pinion rod 75 extended and is secured thereto in any suitable way such as by a pin 136. The outer end of the collar 135 has a diametrically extending cam surface 137 formed thereon, one edge of said cam surface being adapted to engage the upper end of the pin 134 when the crown gear 79 is rotated to its maximum counter clockwise position as shown in Fig. 23. This reciprocates the pin 134 downwardly onto finger 41, which raises the card clamp 39 upwardly as shown in Fig. 19 so that the card is automatically released therefrom.

In operation the mask 32 is attached to the mask holder 46 by clamping strip 54 and the card 29 is inserted in the card holder 36 between flange 37 and clamp 39. The handle 86 is then rotated in a counter clockwise direction to its starting position, and is then preferably rotated in a clockwise direction the distance of one ratchet tooth 89 as determined by the pawl tooth 91. A forward movement of the handle member 81 through slot 84 now causes the carriage 61 to move forwardly, carrying with it differential gear 59. This differential gear acts on the teeth 58 of rack bars 44 and 51, causing said bars to slide forwardly carrying the card 29 and mark 32 ahead to a definite longitudinal position as determined by the stop arms 69 and 70 engaging their respective stop screws 71. The entire attachment is now moved to the left as seen in Fig. 10, with frame grooves 107 and 108 sliding on rods 105 and 106 until one of the shoulders 112 on stop arm 113 engages its corresponding stop 110a, which positions the card 29 transversely in correct position with respect to mask 32 and electro-plate 30. The handle 53 is manually actuated to the right as seen in Fig. 10 until ear 47 engages arm 101. The platen 26 is now caused to move downwardly and forwardly across card 29, which prints the notation on the card 29 as seen in Fig. 7, since the mask 32 and card 29 are positioned as shown in Fig. 4, the slot 35 exposing the address part of the electro-plate 30.

When the platen 26 is released from the card 29, said card rises to an inclined position as shown in Fig. 20 under the influence of spring 128 acting on card holder 36 so that further movement will not smear ink from the inking ribbon across the card. The holder member 81 is now moved rearwardly, sliding in the slot 84 to its rearmost position in which a new rachet tooth 89 engages the pawl finger 91 as seen in Fig. 18, due to the lateral action of the pawl 90 permitted by slot 93. The partial clockwise rotation of the handle 81 is now continued for causing crown gear teeth 80 to partially rotate the pinion rod 75. The pinion rod 75 acts on teeth 74 of 67 and 68 to cause the stop arms 69 and 70 to move to a new position opposite a new pair of stop screws 71. This partial rotation of the pinion rod 75 also acts on teeth 115 of stop arm 113 so as to partially rotate said arm 113 and bring a new stop shoulder 112 in line with a new stop 110b.

The handle member 81 is now moved forwardly in slot 84 to its former position, which moves the rods 44 and 51 forwardly by means of differential gear 59, thus locating card 29 and mask 32 in a new longitudinal position as determined between stop arms 69 and 70 engaging a new pair of stop screws 71. The entire attachment is now moved to the left as seen in Fig. 10 until a stop shoulder 112 engages the stop 110b which limits the card 29 transversely in correct position with reference to electro-plate 30. The handle 53 is now moved to the left until said handle engages stop arm 119, which positions the mask 32 in correct transverse position relative to the electro-plate 30. The platen 26 is now caused to move downwardly and forwardly across the card 29 which produces a printed card as seen in Fig. 8, the mask 32 and card 29 being arranged as seen in Fig. 5.

This last cycle of operation is then repeated to produce the finished card as shown in Fig. 9 with the card 29 and mask 32 in position as shown in Fig. 6. It should be understood that when the crown gear 79 is in its rearmost position, the rear series of crown gear teeth 80a extend into the annular opening formed by section 78 on pinion rod 75 so that rotation of the handle 86 is permitted. When the crown gear 79 is in its foremost position, both series of crown gear teeth 80 and 80a engage the teeth of pinion rod 75 so that the handle 86 is then locked and is prevented from rotation, which would be apt to make inaccurate results. The longitudinal position of the entire attachment carriage may be changed by loosening set screws 104 and then sliding ears 103 along arms 101, after which set screws 104 are again tightened. Upon downward pressure on indicator arm 125, lock arm 122 is released from teeth 120 so that stop arm 119 may be then moved axially of the rod 109 to position said stop arm 119 correctly as shown by pointer 126 co-acting with scale 127.

I would state in conclusion that while the illustrated examples constitute a practical embodiment of my invention, I do not limit myself precisely to the details herein illustrated and described, since manifestly the same can be considerably varied without departing from the spirit of the invention as defined in the appended claims.

I claim:

1. In a printing attachment, the combination with a printing plate having a plurality of lines of characters and means to press a card to be printed onto said plate, of a mask having a slot and interposed between said plate and card so that said slot registers with a portion of the lines on said plate, and an operating member operably connected to said card and mask to cause differential movement therebetween to various adjusted positions relative to each other and said plate, said operating member being capable of both rotation and translation movements to secure said differential movement.

2. In a printing attachment, the combination with a printing plate having a plurality of lines of characters and means to press a card to be printed onto said plate, of a slotted mask interposed between said card and plate, rack bars supporting said card and mask, operating means adapted to move said bars axially and transversely so as to move the card and mask to a plurality of positions relative to said plate.

3. In a printing attachment, the combination with a printing plate having a plurality of lines of characters and means to press a card to be printed onto said plate, of a mask interposed between said card and plate and having a plurality of slots offset in spaced relation, and a single control handle adapted to move both said mask and card differentially relative to each other so that the slots and portions of the card are successively exposed to different areas of the plate during successive movements of the pressing means.

4. In a printing attachment, the combination with a printing plate having a plurality of lines of characters and means to press a card to be printed onto said plate, of a slotted mask interposed between said card and plate, slide bars directly connected to said card and mask, operating means adapted to move said bars axially and transversely, and stop means adapted to limit the movement of said bars so as to position the card and mask in a plurality of printing positions relative to said plate.

5. In a printing attachment, the combination with a printing plate having a plurality of lines of characters and means to press a card to be printed onto said plate, of a slotted mask interposed between said card and plate, slide bars supporting said card and mask, rack teeth formed on said slide bars, a pinion meshing with the rack teeth of said bars, and control means associated with said pinion adapted to cause the translation thereof and the axial movement of said bars so as to position the card and mask in predetermined position relative to said plate.

6. In a printing attachment, the combination with a printing plate having a plurality of lines of characters and means to press a card to be printed onto said plate, of a slotted mask interposed between said card and plate, slide bars supporting said card and mask, a pinion meshing with rack teeth on said bars, control means adapted to cause translation of said pinion and axial movement of said bars, and stops adapted to limit the axial movement of said bars so as to locate the card and mask in predetermined position relative to said plate.

7. In a printing attachment, the combination with a printing plate having a plurality of lines of characters and means to press a card to be printed onto said plate, of a slotted mask interposed between said card and plate, slide bars supporting said card and mask, control means for moving the bars axially, a stop member associated with each bar, a series of stops associated with each stop member, means for moving said stop members to selectively engage a stop so as to limit the axial movement of the bars and position the card and mask in predetermined printing position relative to said plate.

8. In a printing attachment, the combination with a printing plate having a plurality of lines of characters and means to press a card to be printed onto said plate, of a slotted mask interposed between said card and plate, slide bars supporting said card and mask, control means for moving the bars axially, a stop member associated with each bar, a rotatably mounted rod having gear teeth meshing with gear teeth formed on said stop members, a series of stops, the rotation of said rod being adapted to partially rotate said stop members to a selected stop, the engagement of said stop members and stops being adapted to limit the axial movement of said bars and locate the card and mask in predetermined position relative to said plate.

9. In a printing attachment, the combination with a printing plate having a plurality of lines of characters and means to press a card to be printed onto said plate, of a slotted mask interposed between said card and plate, a mask and card control unit, a stop rod associated with said unit, a plurality of stops on said rod, a stop member on said unit adapted to be adjusted so as to selectively engage a stop and locate the card and mask in a predetermined transverse position relative to said plate, when said unit is moved axially of said rod.

10. In a printing attachment, the combination with a printing plate having a plurality of lines of characters and means to press a card to be printed onto said plate, of a slotted mask interposed between said card and plate, a mask and card control unit, a stop rod associated with said unit, a plurality of stops on said rod, a rock shaft rotatably mounted on said unit, a stop member adapted to rotate said stop member into position to selectively engage a stop so as to limit the movement of said unit axially of said rod and locate the card and mask in predetermined position relative to said plate.

11. In a printing attachment, the combination with a printing plate having a plurality of lines of characters and means to press a card to be printed onto said plate, of a slotted mask interposed between said card and plate, a mask and card control unit, a stop rod associated with said unit, a plurality of stops on said rod, a stop member, a control handle associated with said unit and means for causing said stop member to rock when said handle is actuated so as to selectively engage a stop and limit the transverse movement of the unit and locate the card and mask in predetermined position relative to said plate.

12. In a printing attachment, the combination with a printing plate having a plurality of lines of characters and means to press a card to be printed onto said plate, of a slotted mask interposed between said card and plate, slide bars supporting said card and mask, and operating member adapted to cause the axial movement of said bars, a pinion rod associated with said control member, gear teeth on said control member adapted to mesh with said pinion rod so as to rock said pinion rod when said control member is rocked, stop members having teeth meshing with the teeth of the pinion rod, and a series of stops adapted to be engaged by said stop members so as to limit the axial movement of said slide bars and locate the card and mask in predetermined position relative to said plate.

13. In a printing attachment, the combination with a printing plate having a plurality of lines of characters and means to press a card to be printed onto said plate, of a slotted mask interposed between said card and plate, slide bars supporting said card and mask, an operating member adapted to cause the axial movement of said bars, a pinion rod associated with said control member, gear teeth on said control member adapted to mesh with said pinion rod so as to rock said pinion rod when said control member is rocked, stop members having teeth meshing with the teeth of the pinion rod, and a series of stops adapted to be engaged by said stop members so as to limit the axial movement of said slide bars and means for locking the control member against rotation during a portion of the axial movement of said slide bars.

14. In a printing attachment, the combination with a printing plate having a plurality of lines of characters and means to press a card to be printed onto said plate, of a slotted mask interposed between said card and plate, a mask and card control unit, a control member on said unit, a pinion rod rotatably mounted on said unit, stop members operably connected to said pinion rod, a plurality of stops adapted to be selectively engaged by said stop members so as to locate said card and mask in predetermined position relative to said plate, and ratchet means associated with said control member adapted to limit the rocking of the control member to a step by step movement.

15. In a printing attachment, the combination with a printing plate having a plurality of lines of characters and means to press a card to be printed onto said plate, of a slotted mask interposed between said card and plate, a mask and card control unit, a stop rod associated with said unit, a plurality of stops on said rod having successively increasing vertical heights, a rotatably mounted stop member, a plurality of stop shoulders on said stop member at successively increasing radial distances from the center of said stop member, means for moving said control unit axially of said stop rod, and means for actuating said stop member so that said stop shoulders selectively and successively engage said stops thus limiting the transverse movement of said unit and locating the card and mask in predetermined position relative to said plate.

16. In a printing attachment, the combination with a printing plate having a plurality of lines of characters and means to press a card to be printed onto said plate, of a slotted mask interposed between said card and plate, a mask and card control unit, a pinion rod associated with said unit, a pair of stop arms having teeth meshing with said pinion rod, a pair of series of adjustable stops arranged adjacent said stop arms, and means for rotating said stop arms to selectively engage said stops for limiting longitudinal movement of said control unit and locating said card and mask in predetermined position relative to said plate.

17. In a printing attachment, the combination with a printing plate having a plurality of lines of characters and means to press a card to be printed onto said plate, of a slotted mask interposed between said card and plate, a mask and card control unit, a pair of bars slidably mounted on said unit and said control unit being adapted to cause the longitudinal and transverse movement of said card and mask relative to said plate, and means for moving said mask transversely of said plate and independently of said control unit.

18. In a printing attachment, the combination with a printing plate having a plurality of lines of characters and means to press a card to be printed onto said plate, of a slotted mask interposed between said card and plate, a mask and card control unit adapted to cause the longitudinal and transverse movement of said card and mask relative to said plate, means for moving said mask transversely of said plate and independently of said control unit, a scale and pointer associated with said stop member, and means for adjusting said pointer and stop member longitudinally of said scale so as to regulate the transverse movement of said mask.

19. In a printing attachment, the combination with a printing plate having a plurality of lines of characters and means to press a card to be printed onto said plate, of a slotted mask interposed between said card and plate, a mask and card control comprising a single handle adapted to locate the position of said card and mask relative to said plate, clamping means for detachably securing said card to said control unit, and means operated by said handle for automatically disengaging said clamping means from said card after a cycle of operations.

20. In a printing attachment, the combination with a printing plate having a plurality of lines of characters and means to press a card to be printed onto said plate, of a slotted mask interposed between said card and plate, a mask and card control comprising a single control handle adapted to locate the position of said card and mask relative to said plate, a rock shaft rotatably associated with said control handle, clamping means for detachably securing said card to said control unit, and cam means on said rock shaft adapted to automatically disengage said clamping means from said card after a cycle of operations.

21. In a printing attachment, the combination with a printing plate having a plurality of lines of characters, and means to press a card to be printed onto said plate, of a card holder, a mask holder, means mounting said card holder and mask holder for relative differential movement, means controlling relative longitudinal movement between said holders, means controlling relative transverse movement between said holders, and a single operating means for producing differential movement between said card holder and mask holder associated for operation with both of said controlling means to provide interdependent operation between said controlling means.

22. In a printing attachment, the combination with a printing plate having a plurality of lines of characters, and means to press a card to be printed onto said plate, of a card holder, a mask holder, a single operating means for securing operation of said card holder and mask holder for setting one of said holders relative to the other successively in a series of predetermined positions for each cycle of operation, means for controlling the longitudinal movement and means for controlling the transverse movement of the card holder relative to the mask holder the relative transverse movement between the card and mask holders being arrested in certain of said predetermined positions.

23. In a printing attachment, the combination with a printing plate and means to press a card to be printed onto said plate, of a slotted mask interposed between said card and plate, a pair of rack bars, means mounting said rack bars for axial sliding movement, means connecting the mask and the card to separate rack bars, a differential mechanism connecting the rack bars, means for operating the differential mechanism to move said bars differentially relative each other and stop means for limiting the axial movement of each of the bars.

EDWARD W. SIBLEY.